(12) United States Patent
Bolan

(10) Patent No.: US 11,530,939 B2
(45) Date of Patent: Dec. 20, 2022

(54) MONITORING FLOW PARAMETERS WITH NATURAL EXPRESSIONS

(71) Applicant: Michael L. Bolan, Hillsboro, TX (US)

(72) Inventor: Michael L. Bolan, Hillsboro, TX (US)

(73) Assignee: Michael L. Bolan, Hillsboro, TX (US)

( * ) Notice: Subject to any disclaimer, the term of this patent is extended or adjusted under 35 U.S.C. 154(b) by 757 days.

(21) Appl. No.: 16/460,624

(22) Filed: Jul. 2, 2019

(65) Prior Publication Data

US 2020/0003596 A1 Jan. 2, 2020

Related U.S. Application Data

(60) Provisional application No. 62/693,204, filed on Jul. 2, 2018.

(51) Int. Cl.
| | | |
|---|---|---|
| *G01F 1/684* | (2006.01) |
| *G01F 23/296* | (2022.01) |
| *G01F 23/2962* | (2022.01) |
| *G01F 25/20* | (2022.01) |
| *G01F 1/66* | (2022.01) |
| *G01F 1/002* | (2022.01) |

(52) U.S. Cl.
CPC ............ *G01F 1/6842* (2013.01); *G01F 1/002* (2013.01); *G01F 1/666* (2013.01); *G01F 23/2962* (2013.01); *G01F 23/2966* (2013.01); *G01F 25/20* (2022.01)

(58) Field of Classification Search
CPC ........ G01F 1/6842; G01F 1/002; G01F 1/666; G01F 23/2962; G01F 23/2966; G01F 25/20
See application file for complete search history.

(56) References Cited

U.S. PATENT DOCUMENTS

| | | | | |
|---|---|---|---|---|
| 2002/0064331 A1* | 5/2002 | Davis | .................. | E21B 47/113 385/12 |
| 2015/0090049 A1* | 4/2015 | Kertesz | .................. | G01F 1/002 429/61 |
| 2017/0089047 A1* | 3/2017 | Kovscek | ................. | E03B 7/072 |

FOREIGN PATENT DOCUMENTS

CA 2329884 A1 * 3/2002 ........... G01C 13/008

* cited by examiner

*Primary Examiner* — Ryan D Walsh
(74) *Attorney, Agent, or Firm* — Stein IP, LLC

(57) ABSTRACT

A monitoring apparatus is disclosed that includes a.) at least one acoustic pickup, b.) a sound pressure sensor acoustically coupled to the at least one acoustic pickup, and c.) a computing device interfaced to the sound pressure sensor. The at least one acoustic pickup may be submerged in or located in proximity to flowing fluid. The sound sensor is configured to acquire sound intensity waveforms naturally generated by the flowing fluid as a source of data patterns for training the apparatus as well stimuli used to generate responses about flow conditions. The computing device is configured to quantify flow parameters of the flowing fluid from sound utterances and visual appearances intrinsically expressed by the flow using machine learning models.

22 Claims, 17 Drawing Sheets

MONITORING FLOW PARAMETERS WITH NATURAL EXPRESSIONS

CROSS-REFERENCE TO RELATED APPLICATIONS

This application claims the benefit of and priority to U.S. Provisional Application No. 62/693,204 filed Jul. 2, 2018 in the U.S. Patent and Trademark Office. All disclosures of the document named above are incorporated herein by reference.

BACKGROUND OF THE INVENTION

1. Field of the Invention

The invention relates generally to a flow monitoring apparatus and system that may be useful for management of drainage (e.g., vented flow channels and pipes). More specifically, the invention relates to a system that quantifies flow parameters by listening to and processing the native sounds expressed by a flowing fluid such as water.

2. Description of the Related Art

Water flow measurement is a foundational component of environmental protection and management and is integral to understanding how the dynamics of moving water affect water quality.

Current flow measurement systems and methods have evolved as decentralized, standalone equipment with little consideration for networking. The conventional methods are costly and potentially dangerous for several reasons. One is that human entry into a manhole or sewage pipes is often required for installation and maintenance of conventional equipment. Additionally, equipment for conventional systems generally requires sufficient power to artificially generate and transmit sound waves, as opposed to just listening to the sounds already produced by the natural flow of water. This drastically decreases battery life; requiring frequent replacement or recharge. Moreover, the conventional systems are not adept at measuring low flows and are subject to removal from monitoring sites to calibrate equipment. Thus, there is a lack of available flow monitoring stations that install or remove quickly and safely; have always-attentive, zero power sensor pickups to enable battery life for years; keep electricity/electrical connections in normally dry locations; automatically test for accuracy during run time; have built-in calibration validation; provide multi-factor crosschecks; receive timely maintenance with over-the-air updates; synchronize data acquisition over networks for real time control of wide area flows; and enable widespread monitoring by a addressing the total cost to use.

Existing pipe flow measurement products typically involve some form of area-velocity flow measurement by means of electrically cabled, submerged sensors installed in the flow stream with a separate logger/battery box located near the top of a manhole. The standard features of these units include pressure and/or ultrasonic transmitter/receivers with time-of-flight sensors for artificial sound to measure surface level distance, and doppler effects within the stream for measurement of flow velocity. The sensors are cumbersome and dangerous to install or remove for any reason. The widespread practice requires a person to enter a sewer pipe which is a hazardous confined space. Moreover, the sensors are most commonly mounted in the sewer pipe and often require the mounting of expansion rings that are subject to becoming dislodged, particularly if debris catches the cable connecting the sensor(s) to the logger/power source. Most units have little or no network connectivity, thus requiring time consuming in-person site visits to retrieve data, update software, and/or recalibrate to assure accuracy.

The use of sight and sound sensors to quantify flow parameters relates directly to the way humans gain understanding of the environment by hearing and seeing. Moreover, conventional flow measurement systems do not offer the advantage of remote human observation without being physically at the site. As such, the fouling or dislodgement of the sensors is difficult to identify without the convenient remote viewing of the flow scene; so data quality suffers. Other drawbacks of conventional systems include laborious and difficult-to-maintain calibration; costly and dangerous installation; the absence of methods to update the sensor/logger system while deployed; manual configuration and adjustment of embedded software; erroneous readings that are associated with incorrect user input (e.g. for pipe dimensions) during configuration; electrified sensors that can be fouled and damaged because of precarious placement in the stream; and sensors are prone to electronics and electrical wiring corrosion because they are mounted in or near flowing water.

A primary motivation for installing monitoring equipment is to capture information about flow anomalies. When outlier measurements occur, one is not always certain whether the data are valid or the equipment is malfunctioning. It can be a costly and time-consuming task to decide if the reading was really occurring or bad data. The problem of purging bad data becomes even more critical as sewer operators try to control flows in real time to mitigate sewer overflows into, for example, basements, lakes, rivers and oceans.

Thus, there is a real need to provide a system to monitor drainage flow that avoids the problems described above. Accordingly, the aim of the invention is to provide quick install system powered with a long run time battery that monitors flow by acquiring high resolution data intrinsic to the flow conditions and provides automated, independent, multi-factor crosschecking of that data during operation to confirm the validity of the data and offer the convenience of remote observation of the flow scene for human discernment whenever desired.

SUMMARY OF THE INVENTION

Broadly stated, the objects of the invention are realized by providing a flow monitoring apparatus and system that monitors wide area drainage by listening to and processing the naturally generated sounds of flowing water. More specifically, the invention is based on the finding that the natural sounds of flowing water, as acquired by an acoustic pick up in the form of sound intensity waveforms, may be processed by a sound pressure sensor (SPS) and computing device (e.g., an edge computing device assisted by cloud computing) to quantify flow parameters of the flowing water.

The flow monitoring apparatus and the invention more generally are not limited to quantifying flow characteristics of water but may be applied more broadly to any fluidic media whether liquid or gas.

According to one embodiment, the invention embraces a monitoring apparatus including a.) at least one acoustic pickup, b.) a sound pressure sensor (SPS) acoustically coupled to the at least one acoustic pickup, and c.) a computing device interfaced to the sound sensor. The at least one acoustic pickup is submerged in or located in proximity to flowing fluid. The sound sensor is configured to acquire sound intensity waveforms naturally generated by the flowing fluid as an input data source to algorithms trained by machine learning to quantify flow parameters. The computing device is configured to process expressions native to the flowing fluid for the purpose of predicting flow parameters by listening to sound utterances and observing visual appearances.

In one embodiment of the invention the fluid is water. The flowing water may be storm water, sewer water, wastewater, process water, a natural watershed, or mixtures of the same, and the flowing water is organized by a pipe, a channel, an embankment, a catchment basin, a holding tank, a manhole invert; or a culvert.

In one embodiment of the invention, the sound sensor and the at least one acoustic pickup are configured to recognize sound with frequencies starting as low as 0 Hz.

In an embodiment of the invention, the parameters of the flowing water include one or more of level, width, cross section, direction, turbulence, velocity, volumetric rate, volume, and obstruction.

In an embodiment of the invention, the apparatus is mounted from grade level in a location readily accessible by humans.

In one embodiment of the invention, the computing device is an edge computing device assisted by cloud computing infrastructure. In another embodiment, the computing device is configured for at least one of automated calibration, self-test diagnostics, sound utterance recognition, detection of sound patterns that trigger increased scrutiny, video imaging and inclinometer cross checks for parameters quantified by sound, automated determination of flow channel geometry and wetted cross sectional area, and machine learning.

In one embodiment of the invention, the monitoring apparatus does not require the production of artificial sound to quantify flow parameters of the flowing water.

In an embodiment of the invention, the monitoring apparatus may further include a video image sensor, wherein the image sensor is in communication with the computing device, and the image sensor is configured so that sounds of particular interest can trigger synchronized sight for further validation of the flow parameters.

In another embodiment, the at least one acoustic pickup is acoustically coupled to the sound pressure sensor via a noise isolating sound tube (e.g., without the need for electrical power), the sound tube acts as a tether between the sound pressure sensor and the at least one acoustic pickup, and the sound tube conveys acoustic pressure waves from the flowing water to the sound pressure sensor.

In another embodiment, the monitoring apparatus further includes a supplemental acoustic pickup with a frequency response as low as 0 Hz, said supplemental acoustic pickup is acoustically coupled to the sound pressure sensor, wherein the at least one acoustic pickup is submerged in the flowing water, the supplemental acoustic pickup is located in air open to the atmospheric nearby the at least one acoustic pickup submerged in water, and the supplemental acoustic pickup is configured to acquire the naturally generated sound patterns of the atmospheric conditions to quantify time varying atmospheric pressure.

In an embodiment of the invention, the sound pattern acquired by the supplemental acoustic pickup is subtracted from the sound pattern acquired by the at least one acoustic pickup submerged in water to yield the sound pattern of the water without the effects of changing atmospheric pressure.

In another embodiment, the computing device is configured to gather sound pressure patterns from a third party to validate the sound pressure patterns of the supplemental acoustic pickup.

Another aspect of the invention embraces an acoustic pickup including an active air chamber configured to respond to sound pressure in a fluidic environment; and a sound tube connected to the active air chamber, said sound tube configured to convey sound pressure to a sound sensor, wherein the acoustic pickup is adapted to acquire the naturally generated sound utterances of a moving fluid to quantify its flow parameters, the sound tube acts as a tether between the sound sensor and the acoustic pickup, and a targeted fluid surrounds at least a portion of the active air chamber.

In an embodiment of the invention, the frequency response is as low as 0 Hz.

In an embodiment of the acoustic pickup of the invention, the active air chamber is cylindrical. In another embodiment, the acoustic pickup further includes a stabilizer plumb to stabilize the horizontal and vertical position of the acoustic pickup, wherein the stabilizer plumb is attached to the sound tube tether, and an arced nose formed by the sound tube tether enables the pickup to lay on the bottom of the flow channel and to avoid snagging objects in the moving water. The stabilizer plumb may be positioned substantially vertically and incorporates an adjustment which sets the length of the sound tube arc for the desired placement of the acoustic pickup in the water.

In another embodiment, the acoustic pickup may further include an inclinometer that measures the angle of deflection of the sound tube tether (STT) as another measurement of at least one of velocity, turbulence, direction and obstruction to crosscheck flow parameters acquired from the sound utterances and visual appearances.

Another aspect of the invention embraces an acoustic pickup including a fairing and a sound tube tether, wherein the fairing encloses a chamber, the sound tube tether connection to the fairing provides a chamber with active air, the sound tube is configured to convey sound to a sound pressure sensor, the acoustic pickup is configured to acquire the naturally generated sound utterances of a moving fluid to quantify its flow parameters, the sound tube acts as a tether between the sound sensor and the acoustic pickup to structurally support the pickup, and a targeted fluid surrounds at least a portion of the permeable fairing.

In another embodiment of the invention, sound utterances captured by the acoustic pick up deemed worthy of further investigation may trigger computer vision under certain conditions.

Such conditions include when the increased power and bandwidth necessary to image the flowing water are justified by the need to cross check flow parameters quantified from utterance or supply addition parameters not able to be determined by sound alone.

BRIEF DESCRIPTION OF THE DRAWINGS

The invention is more fully described by reference to the following detailed description and the accompanying drawings wherein.

DETAILED DESCRIPTION OF THE INVENTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
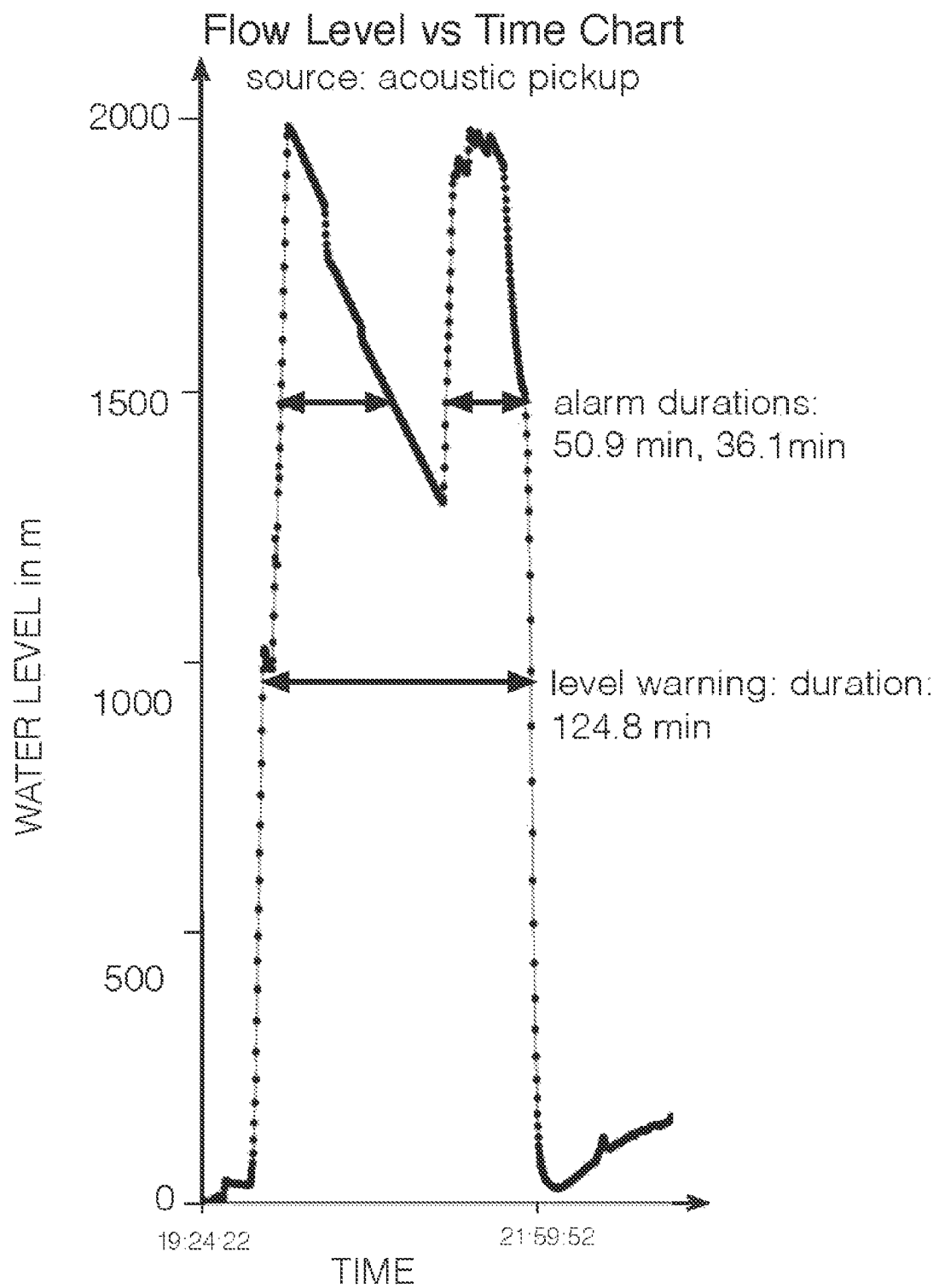
FIG. 1 provides a chart of flowing water level as displayed in real time on a worker's smart phone screen for quick study of a combined sewer overflow (CSO) event. The detail is characteristic of water level resolution made possible by capturing the natural voice of the flow with the acoustic pickup as describe in the invention

Referring more specifically to the figures, FIG. 1 shows a chart resulting from the edge computing device executing a flow level algorithm that accepts sound utterances as inputs and outputs a flow level vs. time chart. Prior to generating this real time chart, a high quality, supervised, site-specific data set was used to train the flow level algorithm. This is an alternative to having code for installation at this particular site. A machine learning model used the training data set as plotted in FIG. 8. Time varying sound pressure in hPa on the left hand axis was labeled corresponding water level depth on the right hand axis. FIG. 1 is a representative chart of flow conditions during a combined sewer overflow (CSO) event. The data was exported live by the flow monitoring apparatus, which can render augmented reality on the screen of a smart phone wherever the utility worker happens to be at the time. The water depth vs. time chart shows a dynamic range of 2 meters with 3 mm water level resolution. The sample rate was one sample per second. The accurate measurements are maintained because the acoustic pick up has high signal to noise performance, independent of weather conditions (e.g., rain, fog or sunshine) and flow conditions (e.g., turbulent flow, white water, or still water). As shown by the graph, the two rapid increases in water level triggered alarm notifications at the 1500 mm level. The alarm persisted until the water level dropped back below the 1500 mm level. The duration of the first instance of the alarm was 50.9 minutes, while the duration of the alarm during the second instance was 36.1 minutes. A high level warning, issued at the 1000 mm level, lasted for 124.8 minutes.

Figure 2:
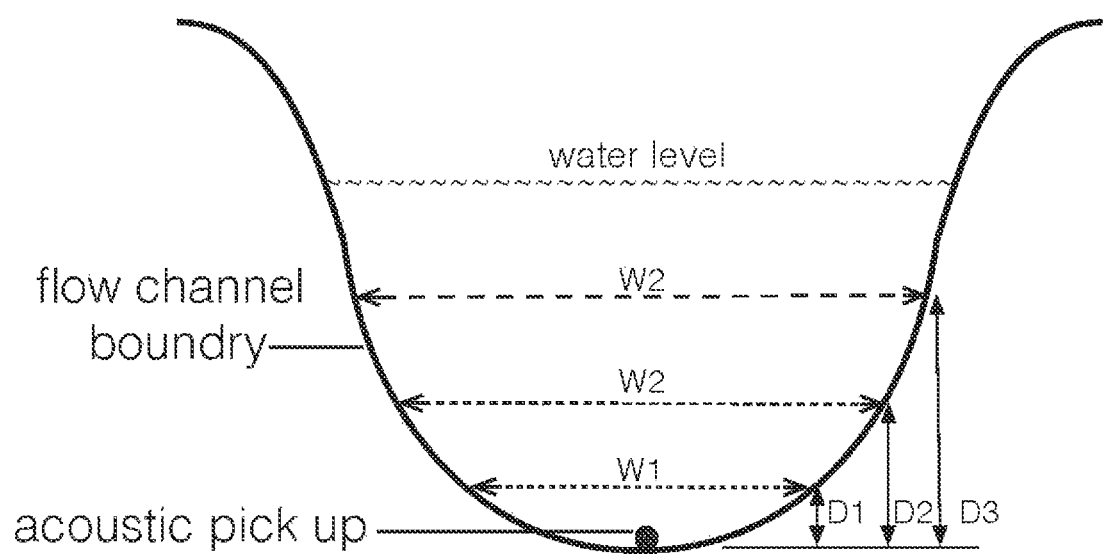
FIG. 2 is a schematic of a flow channel cross section.

Turning to FIG. 2, it is first noted that the shape of a flow channel organizes the flow boundaries. The wetted cross-sectional area (A) of the flow at any one time along with the flow velocity (V) solves the volumetric flow equation Q=AV for the flow rate (Q).

The cross-sectional profile (geometric shape) of the flow channel is a highly desirable parameter to solve this equation. In certain circumstances, the cross-sectional profile may be known from as-built drawings, e.g., a circular pipe of fixed diameter may be disclosed in the drawings. In other circumstances, however, the shape and cross-sectional profile of the flow channel might not be known, particularly when the flow channel involves complex geometries. No matter what information is known about the flow channel geometry, the monitoring apparatus of the present invention with its acoustic pickup(s) and computer vision, may be used to determine important flow parameters, including cross-sectional wetted area, the geometric shape of the flow channel, depth, width, turbulence, direction, velocity, volumetric rate, volume and obstruction.

FIG. 2 shows a flow channel with a complex shape. The acoustic pickup of the invention may provide source data about the depth (D) of the channel as water levels rise and fall over time. Thus, listening to the utterances of the water may provide accurate data about the water depth D in the channel. A corresponding width (W) may be acquired using computer vision. Synchronizing the depth and width measurements obtained by listening to sound utterances for (D depth) and observing visual appearances for (Width) as paired data will reveal over time, the XY coordinates to map the cross-sectional profile (geometry) of the flow channel. Furthermore, after the cross-sectional profile of the flow channel is known, the subsequent on-going depth and width parameters can be tested with diagnostics for fit with the cross-section profile. This enables additional verification of flow parameters and automatic calibration. Thus, synchronized sight and sound-based data acquisitions provide automated, independent, multi-factor cross checking of flow parameter during operation.

Figure 3:
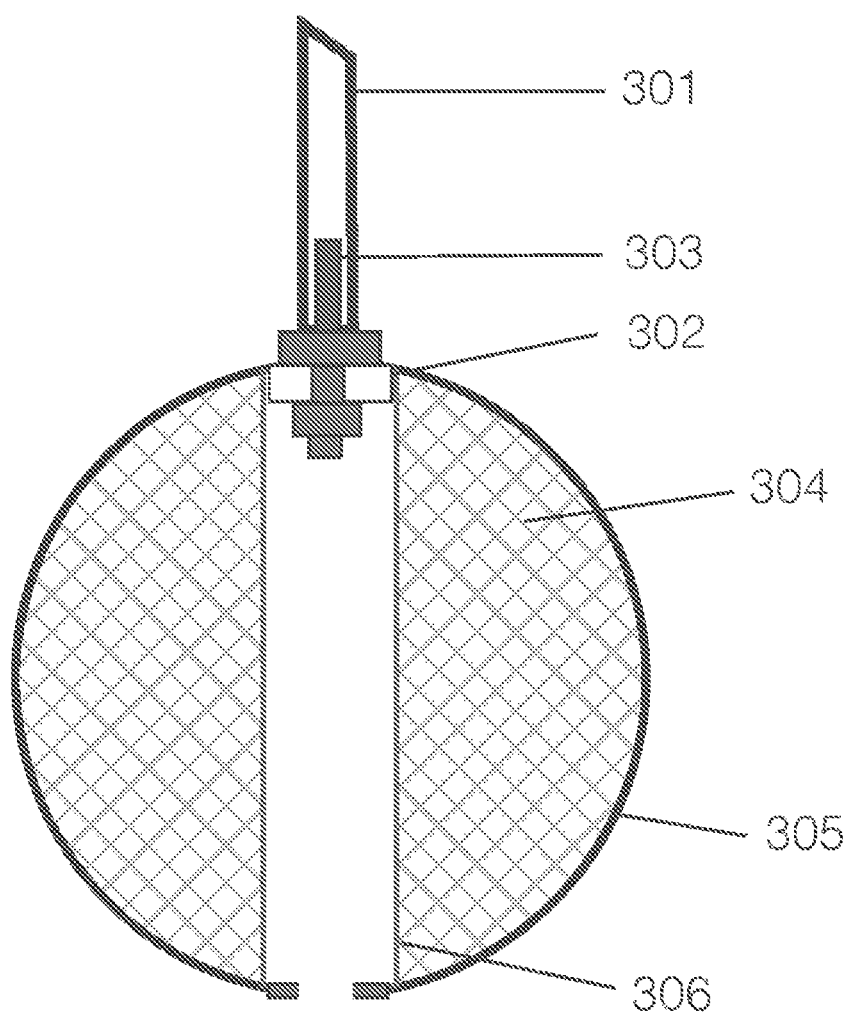
FIG. 3 is a schematic diagram of an acoustic pickup device that is weighted to rest at the bottom of a flow channel with an anti-snag form factor that enables debris to pass by without catchment.

FIG. 3 provides a schematic diagram of an acoustic pickup device, showing a sand filled, weighted, ball-shaped fairing 305, which, in this embodiment of the invention, is 83 mm in diameter. The acoustic pickup device is adapted to pick up the natural sound of a fluid, e.g., flowing water. In this embodiment, the acoustic pickup device includes a polyethylene terephthalate (PET) preform 306 which is encased within an 83 mm fairing 305 filled with sand 304 or another substance which adds weight to the device. The fairing may be of any shape, although in this embodiment it is substantially spherical in part for its anti-snag characteristics. The ball-shaped faring may be made of any type of material compatible with the particular fluid environment, e.g., an aqueous environment. The preform is connected to a cap 302 (in this embodiment, a threaded cap). The cap, in turn, has a pass-through barb adapter 303 for connection to a sound tube, which in this embodiment is made of a chemically resistant, high molecular weight linear polyethylene. The sound tube (or sound tube tether) 301 conveys sound pressure waves from the acoustic pickup to the sound pressure sensor. The sound tube tether also provides a physical connection between the sound pressure sensor and the acoustic pickup device.

Figure 4:
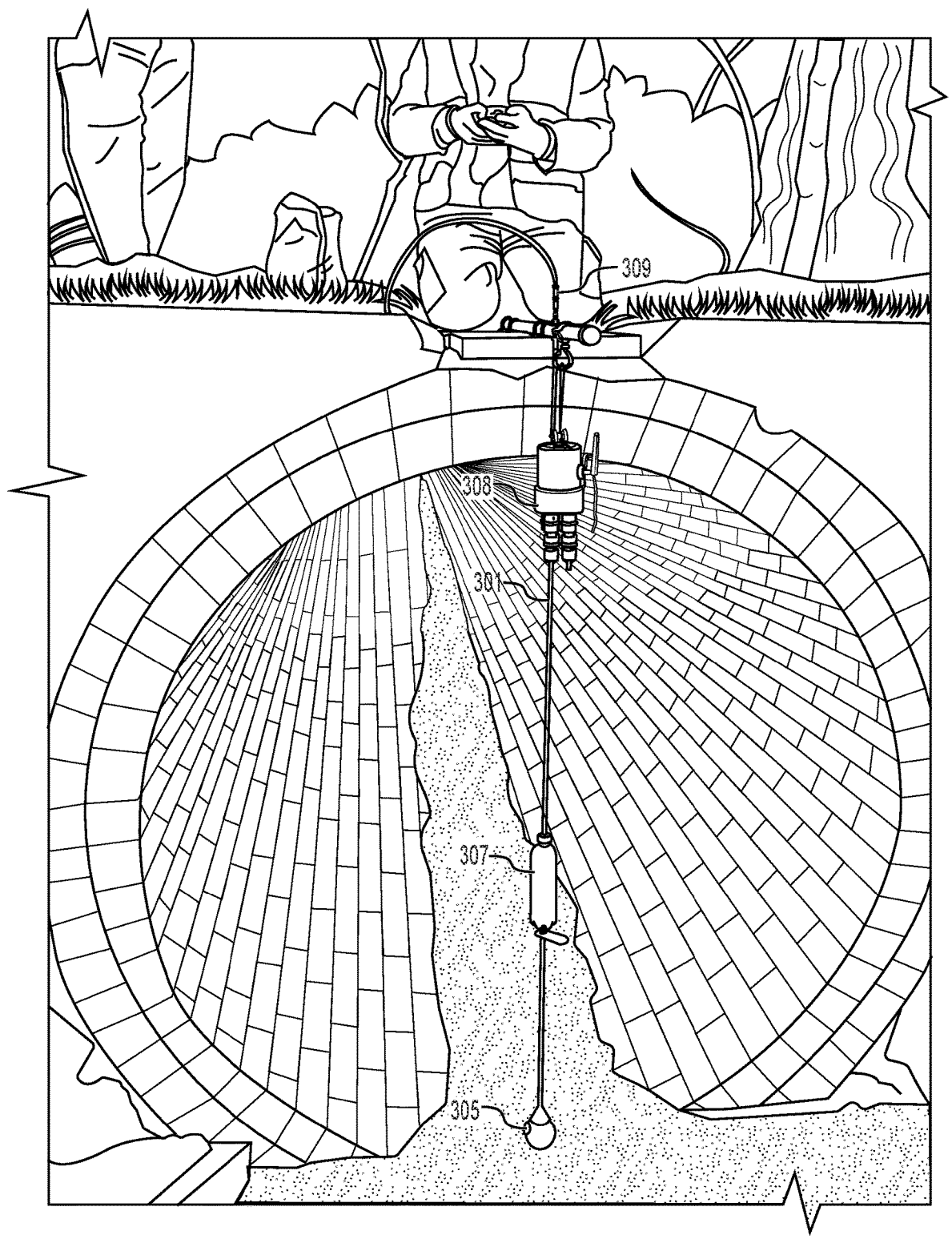
FIG. 4 is a photograph showing a drainage monitoring apparatus at a culvert with the worker performing the installation from readily-accessible grade level.

FIG. 4 provides a photograph showing an embodiment of the flow monitoring apparatus where the worker, from the safety of grade level, installs a submerged, acoustic pickup with a wet seal that separated active air space from water space (incorporated within ball shaped fairing 305), conveyance sound tube tether 301 plumb ballast 307, cantilever bar mount 309 and sound pressure sensor chambers 308 as part of the onsite, edge computing all weather computing enclosure attached to a cantilevered bar mounting. The photograph was taken Dec. 9, 2016, 2:20 p.m., at a northern Kentucky pilot site selected for its debris laden flows. This 6-foot diameter (1820 mm) storm water inlet flows into a combined sewer. The typical flow level is less than 25 mm; however, depending on the intensity and duration of storm event, the runoff can surge and spike the water level. Hence, the 6-foot pipe was built to handle the rare high flow rate as well as the debris associated with the flow.

Figure 5:
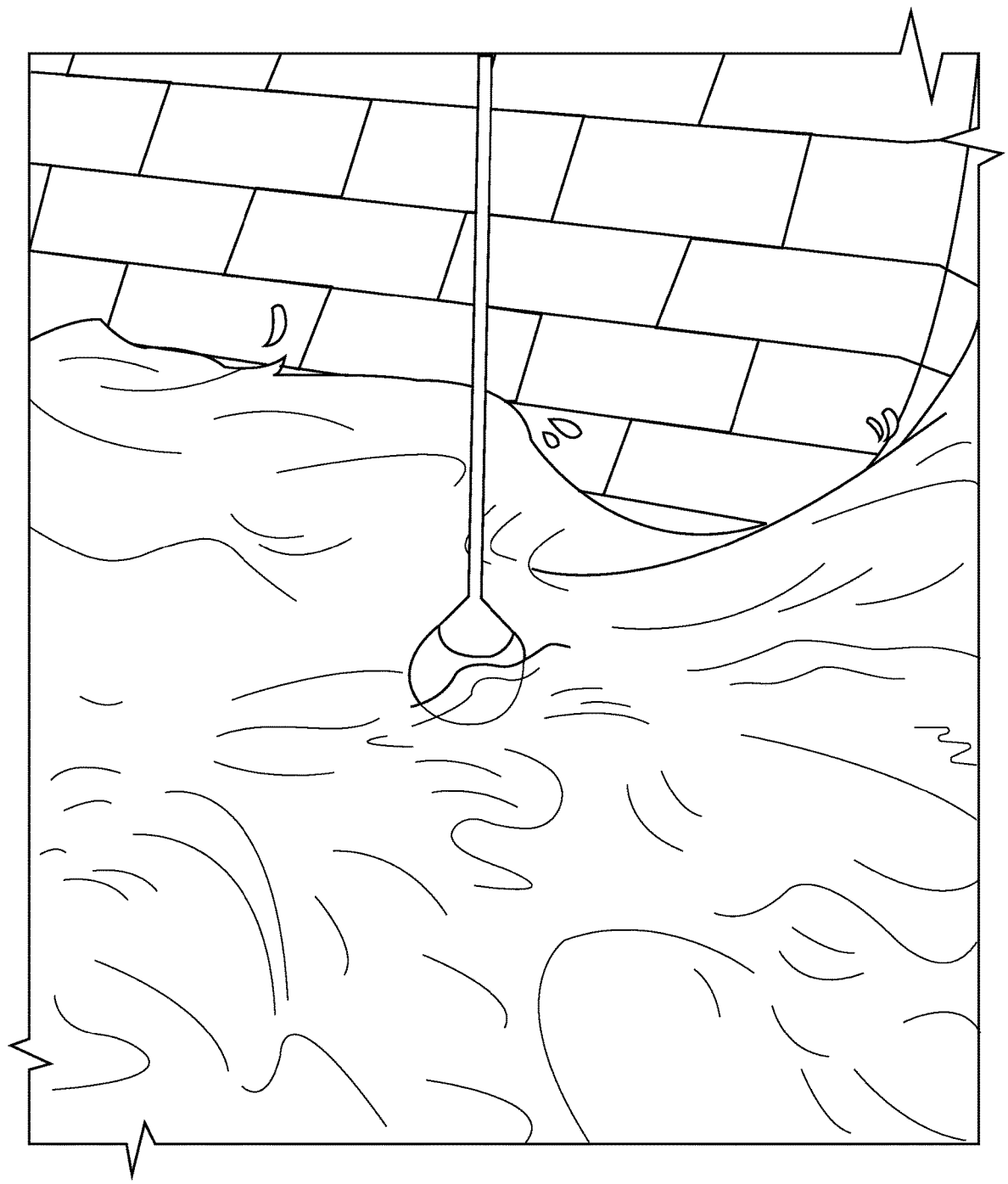
FIG. 5 is a photograph of a horizontal acoustic pickup device acquiring the sound pattern utterances generated by the flow recognized to be characteristic of free unobstructed flow in this pipe.

FIG. 5 is a photograph of an anti-snag acoustic pickup in turbulent water.

Figure 6:
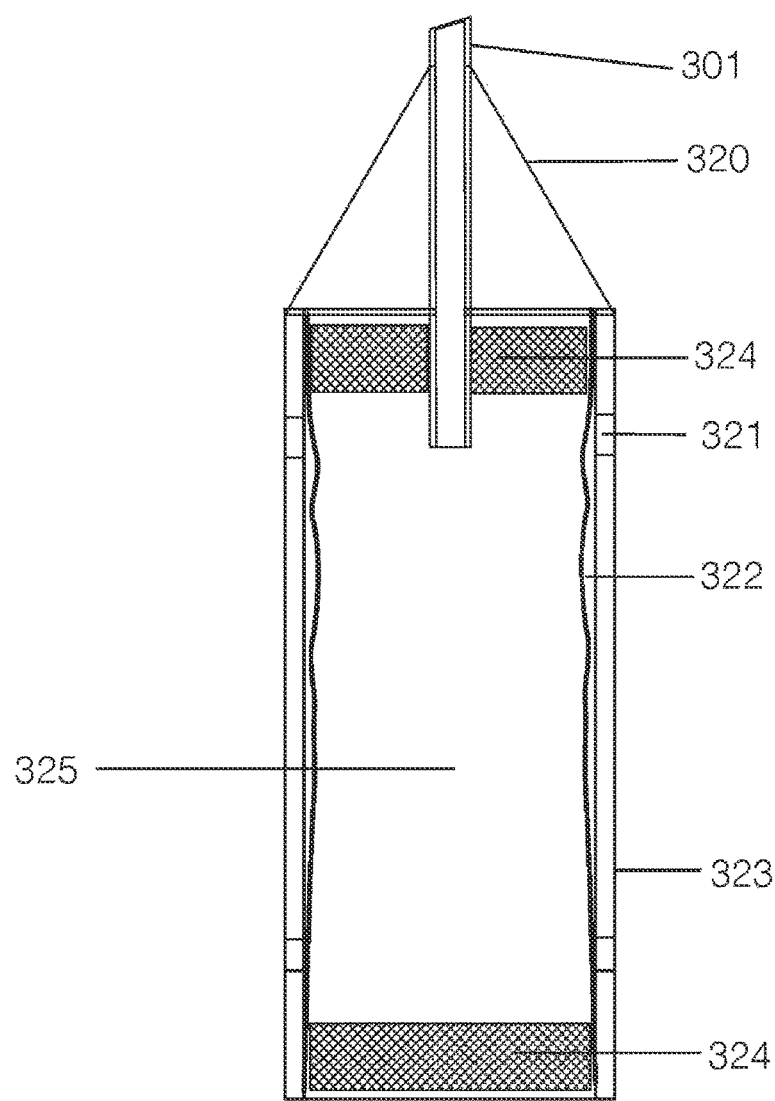
FIG. 6 is a plan diagram of an embodiment of an acoustic pickup device.
Figure 7:
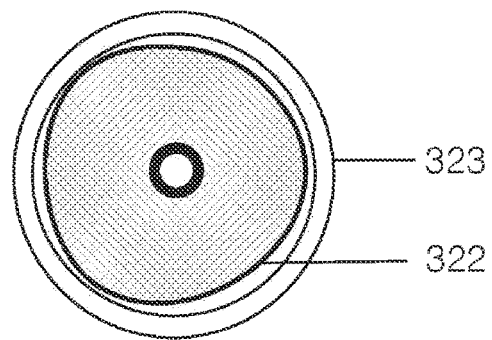
FIG. 7 a cross section diagram showing an embodiment of an acoustic pickup device.

FIG. 6 provides a plan diagram and FIG. 7 a cross section diagram showing an embodiment of an acoustic pickup device. This embodiment of the acoustic pickup device is typically positioned horizontally in the flow channel of the water stream (e.g., in a sewer pipe or culvert). In this way, the acoustic pickup device may be located directly in the flowing stream to recognize the native utterances of the flowing water. In this embodiment of the invention, a sound tube tether 301 is connected to a nose cone 320, which is placed at one end of the acoustic pickup device. The body of the device is a fairing 323, which in this embodiment is made of stainless steel. The fairing 323 includes at least one water vent 321, which allows water, or another fluid, to penetrate the fairing. An elastomeric membrane 322 is placed inside the fairing 323. In this embodiment, the membrane which separates active air space from water space is 0.5 mm thick, 14 mm ID butyl rubber. In other embodiments, the membrane thickness and material may vary.

In one embodiment, the membrane is akin to an a highly flexible inner tubing within the fairing, A stopper 324 fits inside the fairing at the other end of the acoustic pickup device, the stopper forming a solid seal at this end of the device. In this embodiment, the stopper is a 20 mm rubber stopper pressed into the membrane to form a compression seal against the fairing. The type of stopper is not particularly critical, so long as it forms a gas tight seal. An active air chamber 325 inside the membrane responds to the acoustical pressure applied to the outside of the membrane by the flowing water. The acoustic waves are then conveyed from the membrane through the active air chamber 325 and sound tube tether to the sound pressure sensor (not shown in this diagram).

In one embodiment of the invention, the drainage monitoring apparatus may be calibrated by capturing additional truth data from available meteorological sources (e.g., local airport barometric pressure readings) during an opportunistic and substantive atmospheric pressure change while flow level pattern remains relatively constant. Confirming the flow level is relatively constant before and after the atmospheric perturbations enables automated calibrations during run time in addition to algorithm training during the initial supervised machine learning performed on site with a training channel.

Figure 9:
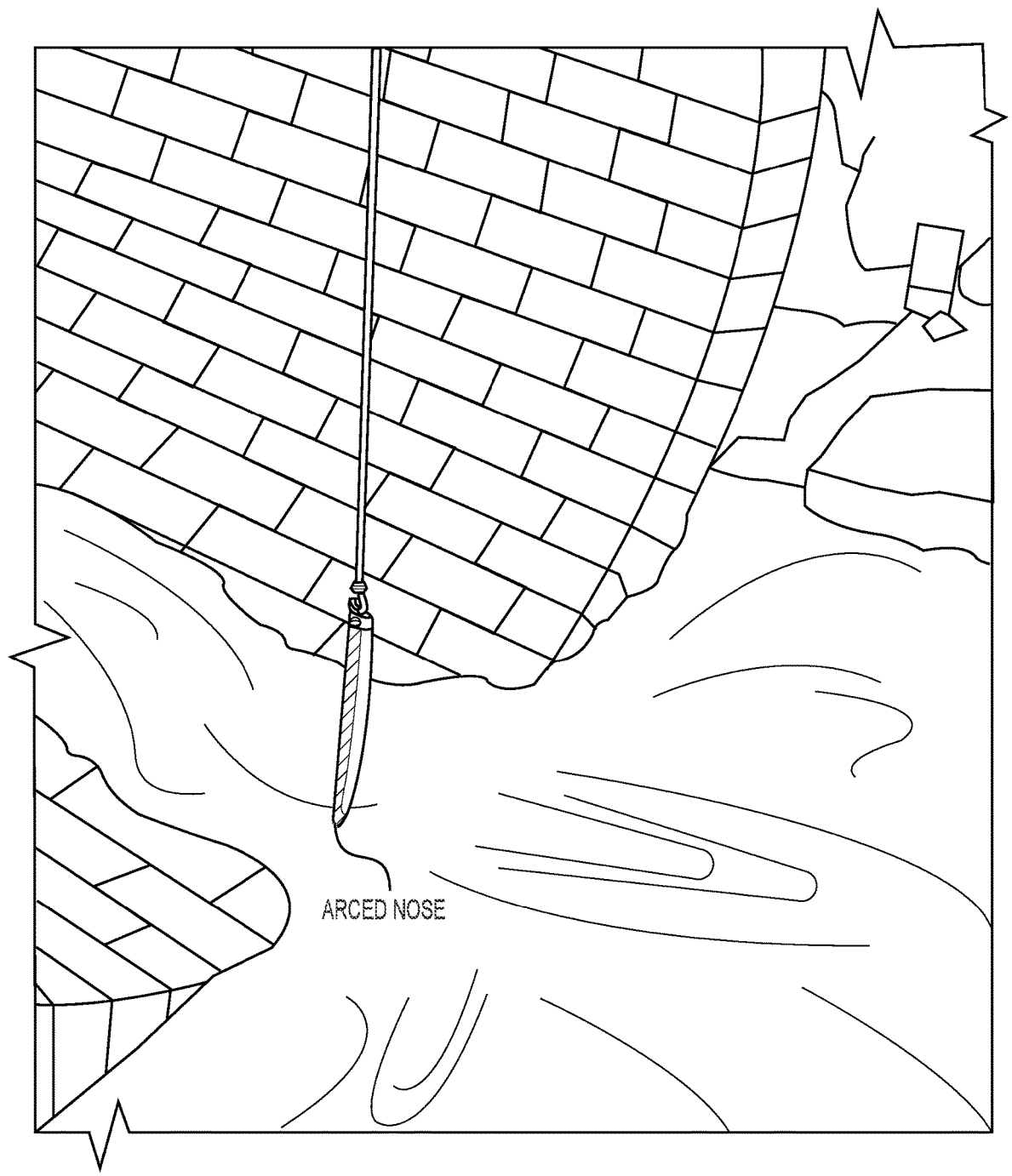
FIG. 9 is a photograph of an acoustic pickup tethered with a sound tube that comprehends further adjustment provided by the arced nose of the sound tube tether to enable a horizontal pickup to be positioned with an adjustable setback within the inlet pipe.

FIG. 9 is a photograph of an acoustic pickup device designed for sound utterance recognition of flowing water. The infrasound can be recognized as low as 0 Hz. The arc pickup recesses into a pipe inlet to compensate for manhole or culvert offset without human entry into the sewer. The self-adjusting arc is configured to automatically seek a position at the bottom of a flow channel. In an embodiment, the compound ballast weight arrangement is designed to release debris in the flow that could otherwise impede the flow of water or foul the pickup. This embodiment also allows for low drag coefficient stabilizer plumb and arced tether of the horizon pickup for anti-snag streamlining. Moreover, this embodiment allows for an acoustic pickup device tethered by a sound tube from an interposer bar or culvert cantilever bar to provide noise isolation and high signal-to-noise truth data.

Figure 10:
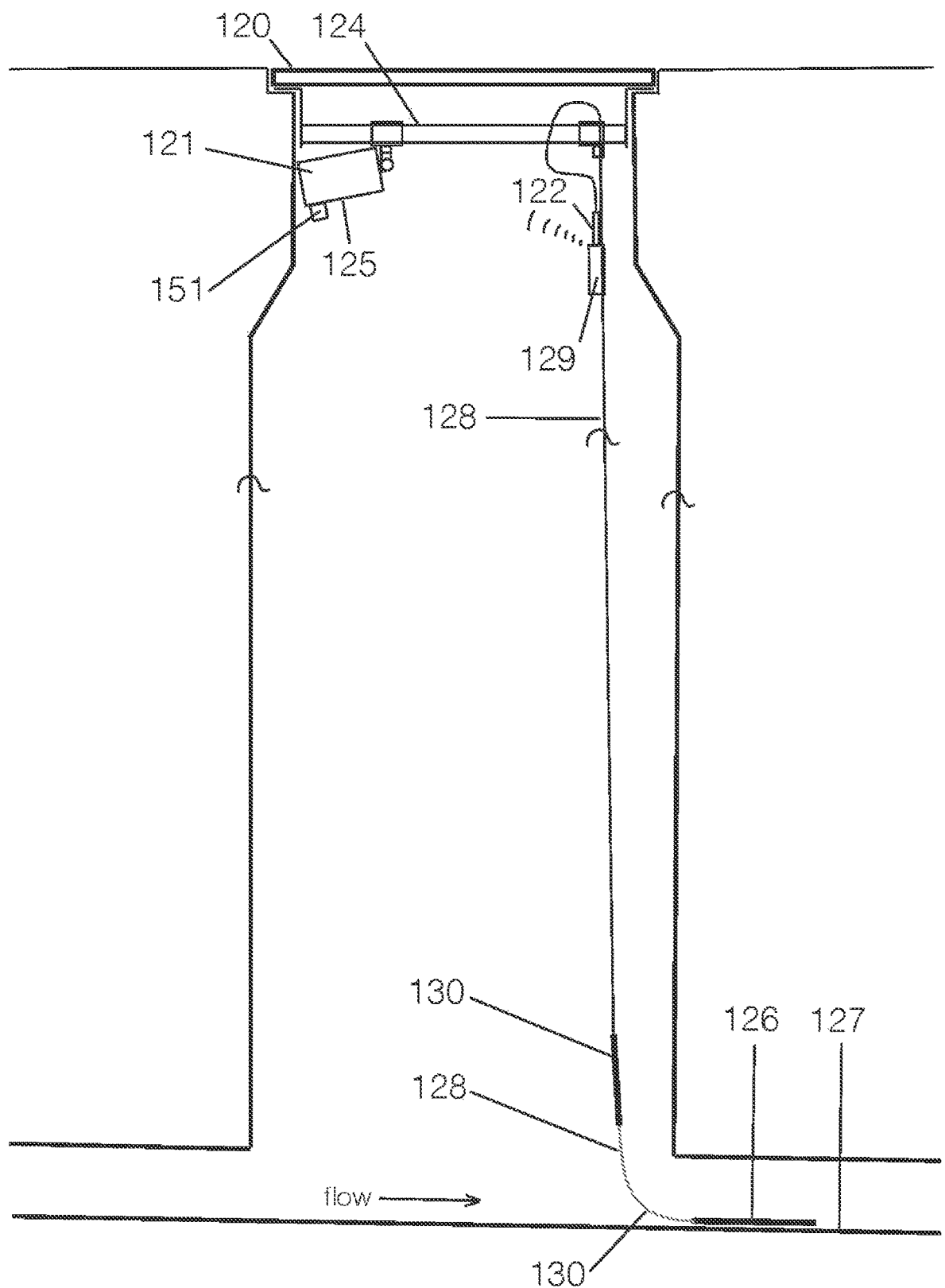
FIG. 10 is a schematic showing installation performed from grade level for mounting the monitoring apparatus under a sewer lid.

FIG. 10 depicts an embodiment of the invention showing installation of a monitoring apparatus at a sewer lid 120. A computing device 121 is positioned underneath a sewer cover, and is mounted, in this embodiment, to an interposer bar 124. The computing device in this embodiment is designed for edge computing and is housed in all-weather, outdoor casing 125. The casing can be IP-68+ rated (completely submersible), tamper resistant/detecting, radio/optical transparent and mounted on a 3-axis gimbal. The display is full color, high resolution, and the video image sensor is 12 mega pixel 151. In this embodiment, the computing device includes a cellular modem, a Bluetooth radio, software for over-the-air updates, software for flow parameter algorithms designed to accept machine learning, power connection for external solar cell, and power connection for quick-swap, long endurance battery pack. An acoustic pickup device 126 is positioned horizontally at the bottom of the flow channel 127. The acoustic pickup is connected, physically and acoustically, to a sound tube (or sound tube tether) 128. On the opposing end, the sound tube tether 128 is connected to the sound pressure sensor enclosed in a sealed cavity 122. An inclinometer 129 (also shown in FIG.

14B) may be secured to the sound tube tether near the interposer bar which supports the tether. A plumb stabilizer 130 is secured to the sound tube tether near the bottom of the manhole. The sound tube tether may form an arced nose 131 between the stabilizer plumb and the acoustic pickup device. This allows the sound tube tether to avoid snagging objects that accompany the flowing water.

Figure 11:
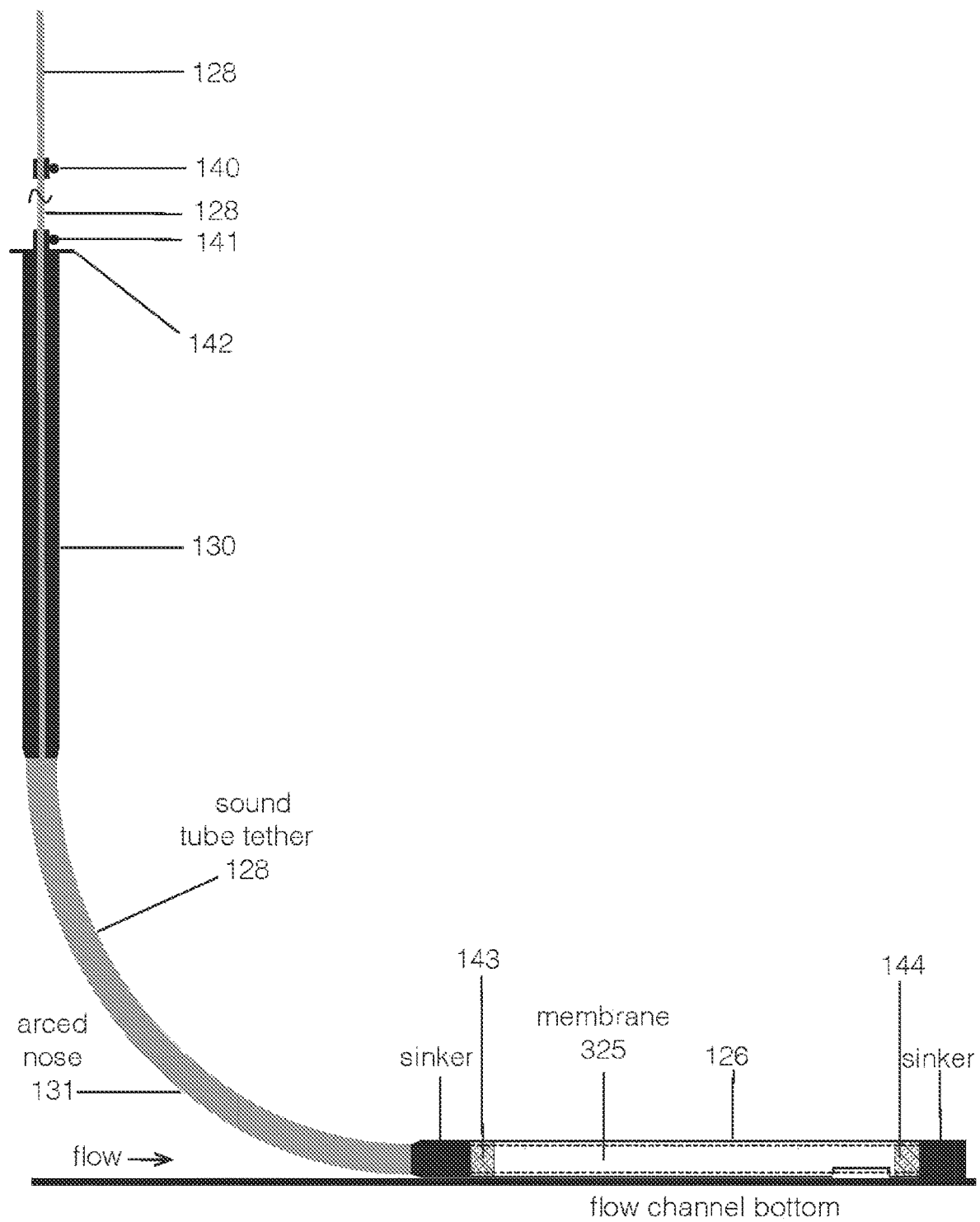
FIG. 11 is a schematic showing an embodiment of an acoustic pickup device installed in a streamlined horizontal position at the bottom of the flow channel.

In another embodiment of the invention, the mechanical deflection angle of the sound tube tether may be quantified by an inclinometer and labeled with corresponding flow velocities for additional, crosschecking of the flow parameters that were quantified by sight and sound, FIG. 11 provides a schematic showing an embodiment of a horizontal acoustic pickup quickly installed and removed from grade level without special tools. The sound tube tether 128 is attached at grade level to a sealed cavity (see also FIG. 14B) that houses a sound pressure sensor and an inclinometer sensor. In this embodiment, the length of the sound tube tether is adjusted using a top cinch 140 and a bottom cinch 141. A colored dot 142 (yellow in this embodiment) is representative of a reference object and a position marker with a known spatial relationship to the flow scene. The marker 142 near to arc length adjustment may be used by time of flight laser distance measurement or computational photography to calibrate measurements made by imaging of the flowing fluid. An adjustable length stabilizer plumb 130 is fastened just below the bottom cinch 141. The stabilizer plumb 130 allows the sound tube tether 128 to form an arced nose 131 such that the acoustic pickup device 126 may be positioned horizontally in flowing fluid (e.g., water) at a flow channel bottom. The low drag coefficient and streamlining of arced nose 131 allows the sound tube tether to avoid snagging debris that could accompany the flow. In this embodiment, a yellow start line 143 and a yellow finish line 144 are marked on the fairing of the adjustable length fairing the acoustic pick up device 126. The start line and finish line of a moving particle in the flow can provide reference points for an alternative, image-based, method of calculating velocity of the flow. A nose cone sinker and a tail sinker form the ends of the housing to ensure more stable positioning at in the bottom of the flow channel which is also further confirmed by on going imagines of the flow scene An active air chamber 325, present inside an elastomeric membrane 322, responds to the acoustical pressure applied to the outside of the membrane by the flowing water.

Sound utterances captured by the acoustic pick up deemed worthy of further investigation may trigger computer vision when the increased power and bandwidth necessary to image the flowing water are justified by the need to cross check flow parameters quantified from utterance or supply addition parameters not able to be determined by sound alone.

In another embodiment of the invention, the stabilizer plumb stabilizes the arced nose of the pickup intake to rest at the on the bottom of the flow boundary over a wide range of flow rates. The vertical drop of the stabilizer plumb may be adjusted by a cinch on the interposer or for the vertical to horizontal transition cantilever bar to facilitate the vertical to horizon transition of the tether.

The sound tube tether conveys sound utterances to a sound sensor without the need of electrical power or wiring. In this way the sound sensor can be located away from the hazards of the flow with not only cost and reliability benefits but also to enable the pick and as well as the sound conveyance over many meters of distance to be powered by natural flow with zero electrical power consumption. This drastically reduces the overall electrical energy needed to be always attentive to flow conditions.

Figure 12:
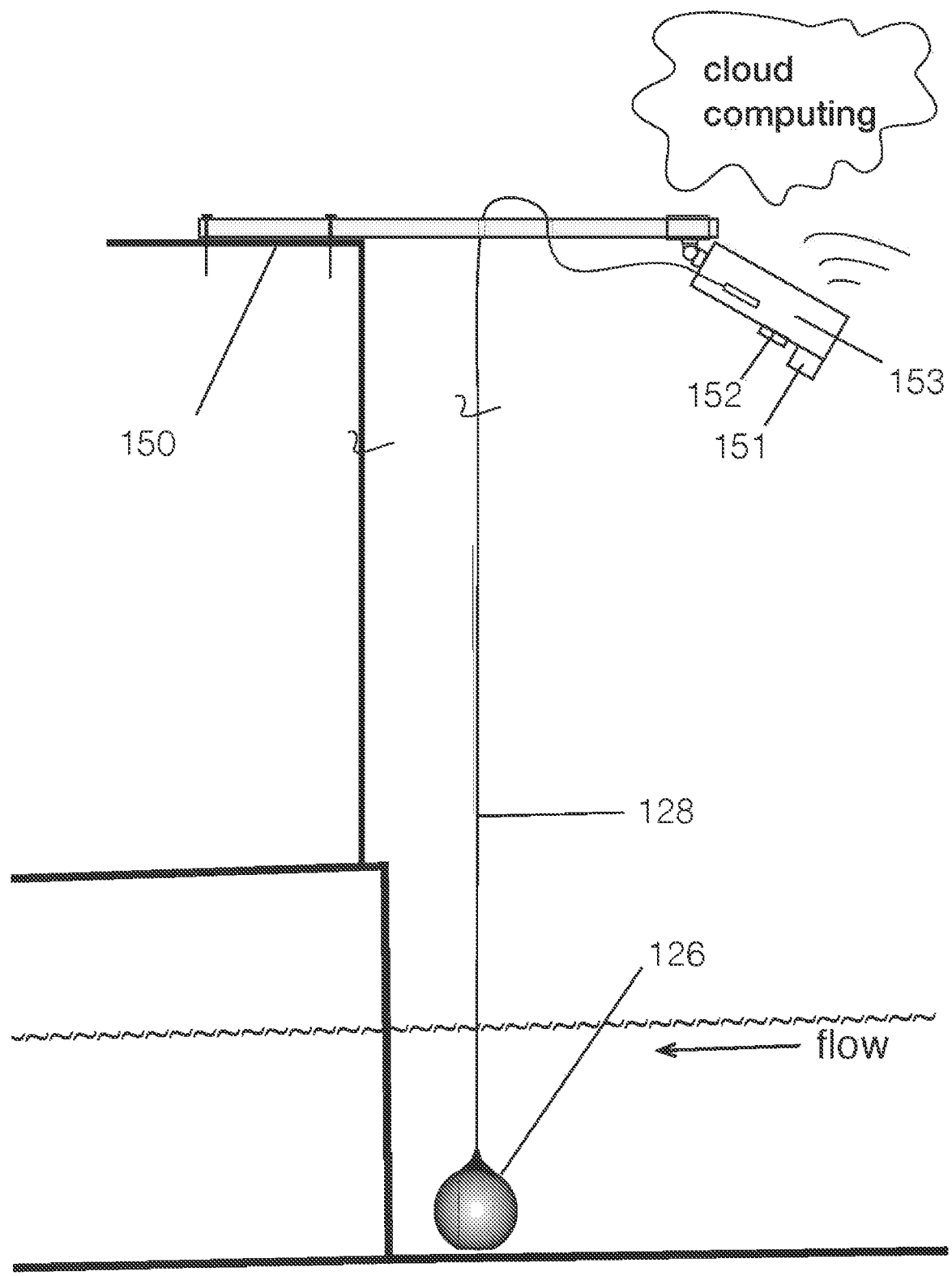
FIG. 12 is a schematic of a monitoring apparatus installed from the overpass of a concrete culvert.

FIG. 12 shows an embodiment of a monitoring apparatus for water flowing beneath a concrete culvert 150. The monitoring apparatus of this embodiment may include the following features: a video image sensor 151, lighting 152, an edge computing device 153, one sound pressure sensor plus positions for eight (8) more, a sound tube tether 128, and a sand-filled anchor for a vertically positioned acoustic pickup 126. A reference object may be used to scale pixels per mm for the flow scene or determine the inclination angle of the sound tube tether to relate angle to flow velocity. In other embodiments of the invention, the monitoring apparatus may include a solar panel as a source of optional power and a swap power bank, both of which may be located away from the flow in proximity to the computing device.

Figure 13:
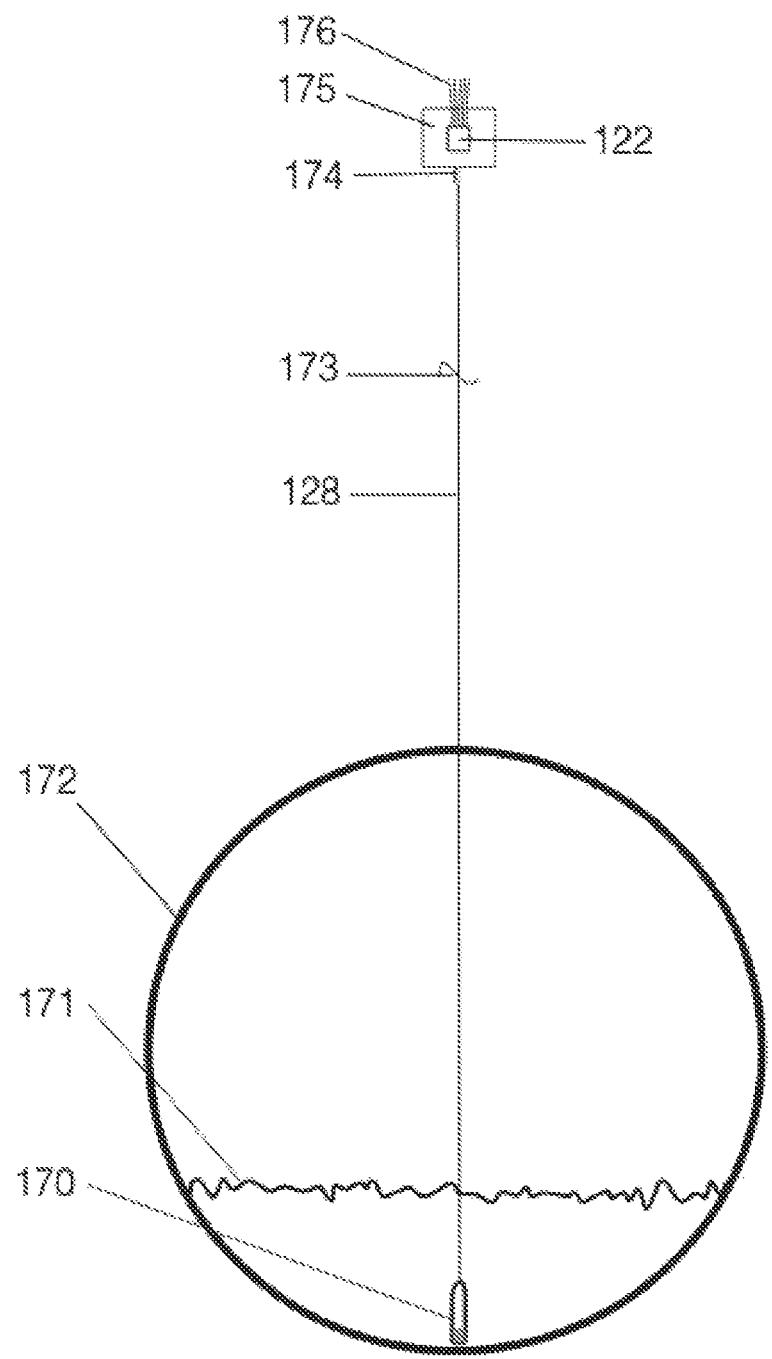
FIG. 13 is a schematic showing aspects of the monitoring apparatus that measures flow in a sewer pipe. The acoustic pickup is in this embodiment is oriented vertically in this embodiment.

FIG. 13 depicts aspects of the monitoring apparatus to measure water flow in a sewer pipe. An acoustic pickup 170 is located substantially vertically in flowing water 171 in a sewer pipe 172. The acoustic pickup 170 is attached to a sound tube tether 128, which is acoustically coupled to a sound pressure sensor 122. The sound tube tether has provisions for an adjustable length 173. In addition to providing acoustic conveyance of the sound pressure, the sound tube tether physically connects the acoustic pickup to the sound pressure sensor 122 via a pressure port 174. Electrical signal and power wires 176 have sealed connections to the sound sensor 122, which is housed within a sound sensor cavity 175.

Figure 14A:
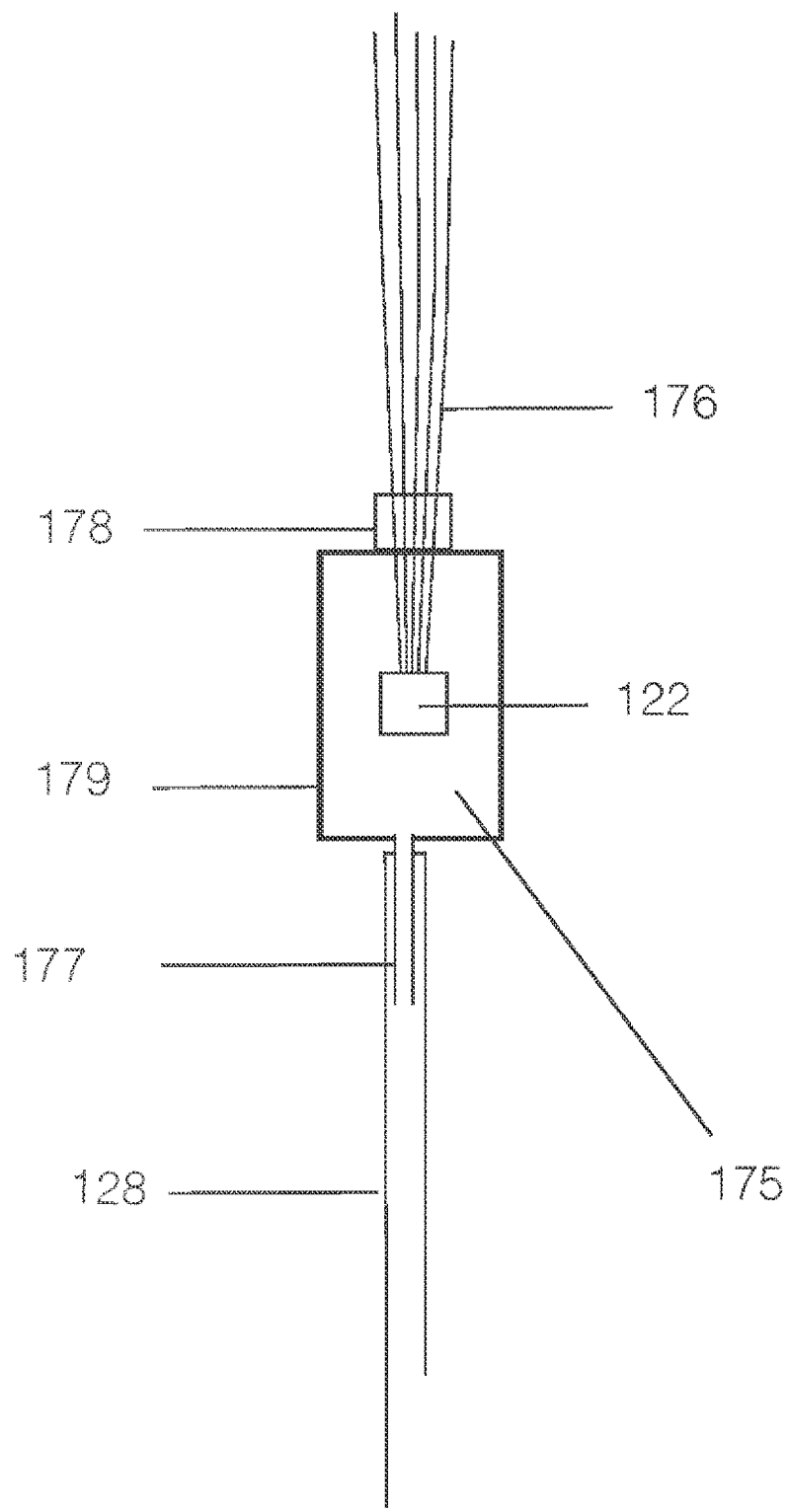
FIGS. 14A and 14B provide schematics of sound sensors enclosed in a sealed cavity used in the monitoring apparatus of the invention.

FIG. 14A provides detail on an embodiment of the sound sensor 122 used in the monitoring apparatus of the invention. In this embodiment, the sound sensor 122 has a connection to a sound tube tether 128 via a tubing barb 177. The barb 177 opens to a cavity 175 in which a sound sensor 122 is located. Electrical signal and power wires 176 are connected to the sound sensor 122 and exit the sensor cavity via an encapsulated wiring feed through 178. The sound sensor 122 can be located within an enclosure 179.

Figure 14B:
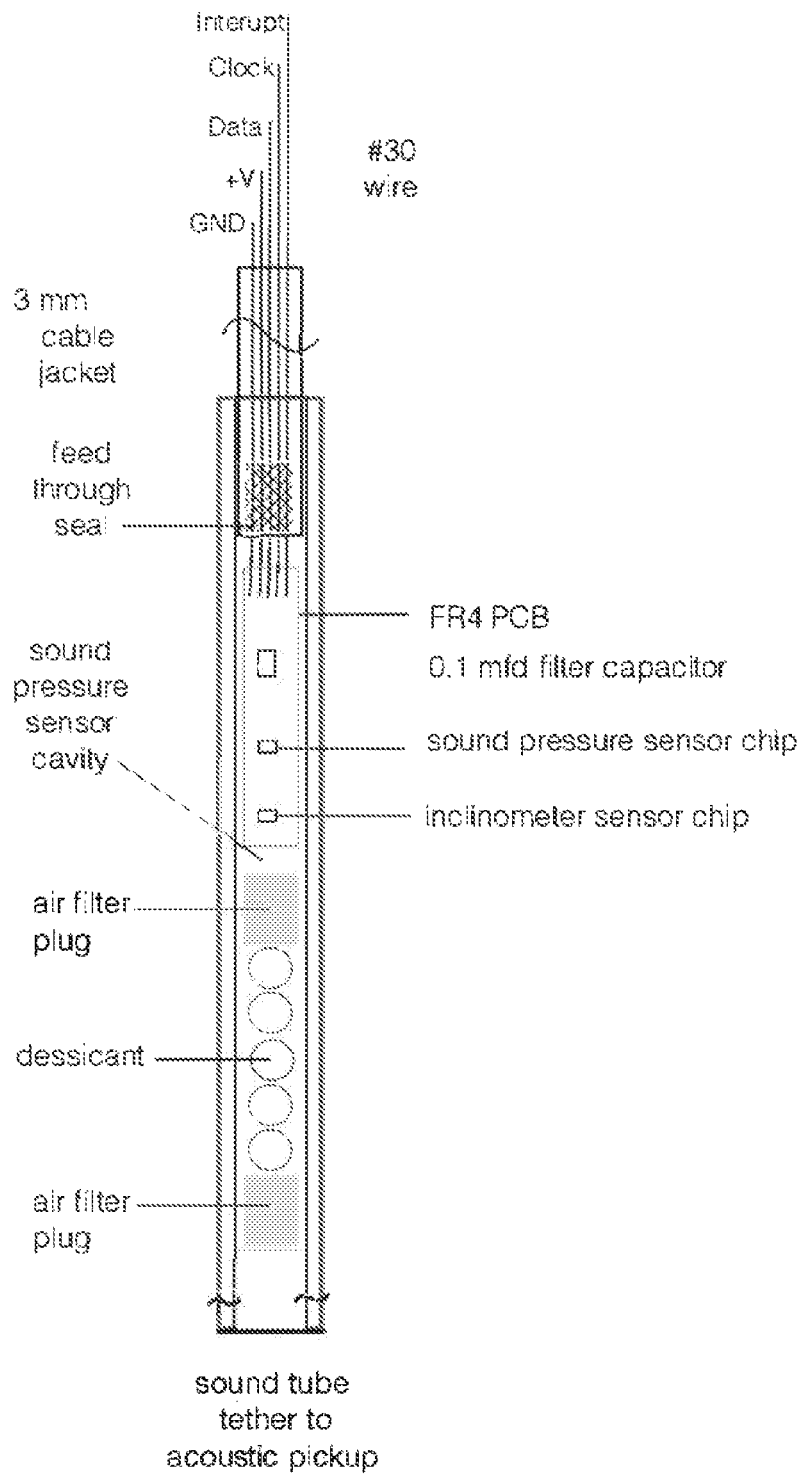

FIG. 14B shows a sound sensor embodiment used in an embodiment of the invention in more detail. The internal components of the sound pressure sensor cavity can include a sound pressure sensor chip as well as an inclinometer chip, a 0.1 mfd filter capacitor, color indicating desiccant, air filter and an FR4 PCB for interconnection. The circuits are wired to an always attentive computer on one end via a sealed feed through which the other end of the cavity is conveyed sound pressure via a sound tube tether connected to the acoustic pickup. Air filter plugs and desiccant can also be located within this end of the sound sensor.

Figure 15:
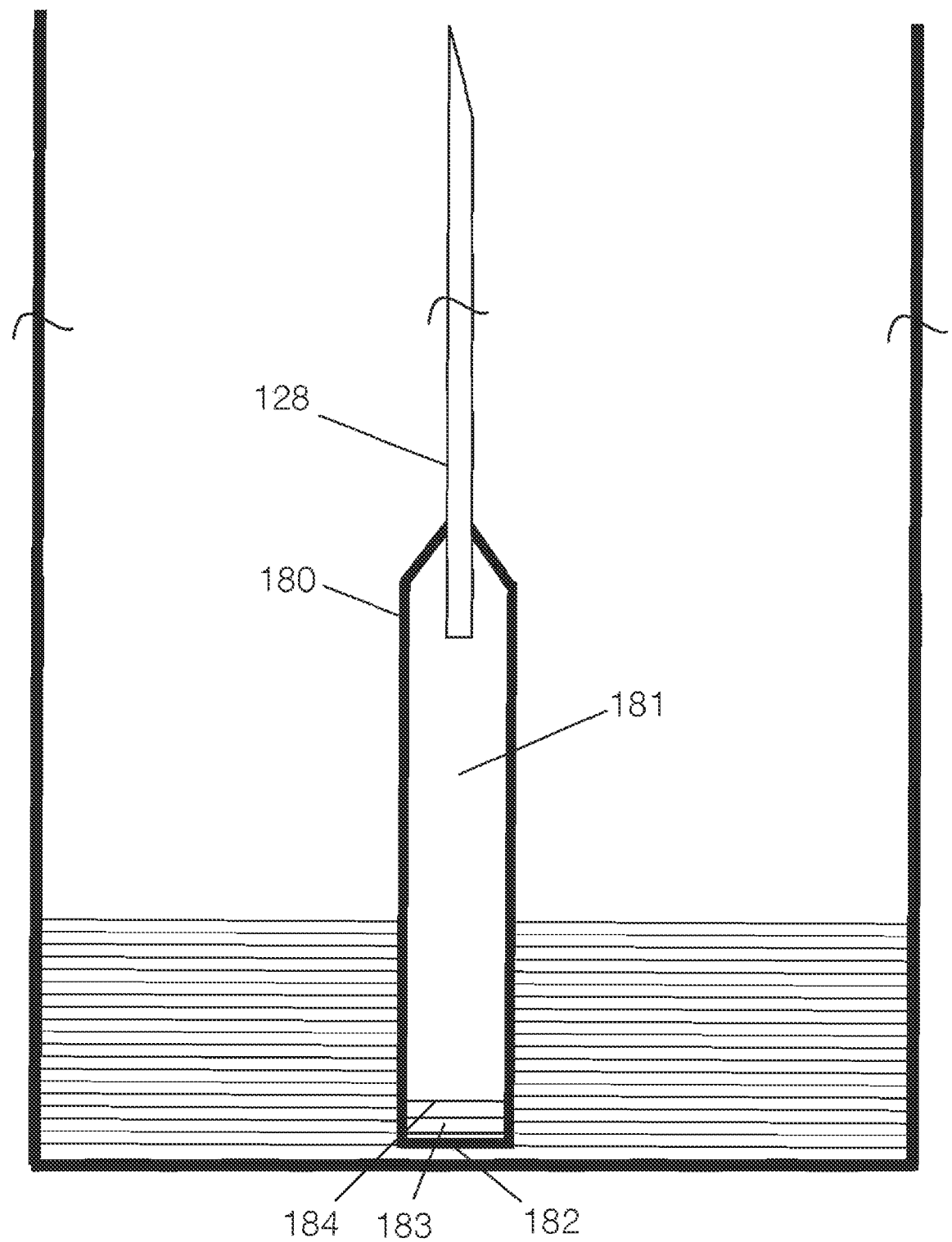
FIG. 15 provides detail on an embodiment of an acoustic pickup whose active air chamber is compressed by a wet seal of the water without a membrane.

FIG. 15 provides more detail on one embodiment of the acoustic pickup. In this embodiment, the sound tube tether 128 is attached to a fairing 180 made of steel to add weight. The fairing, which is 95 mm in length with a 21 mm outer diameter, contains a chamber 181 formed by a 15 mm bore. The sound tube tether 128 has sealed connection to the top of the fairing The bottom of the fairing contains an opening 182 that allows water 183 to enter the pickup chamber 181, in which there is active air space that varies according to flow conditions. The water forms a wet seal to trap air 184 below the level of the flowing water. The portion of the chamber 181 above the water boundary that from a wet seal is active air space.

Figure 16:
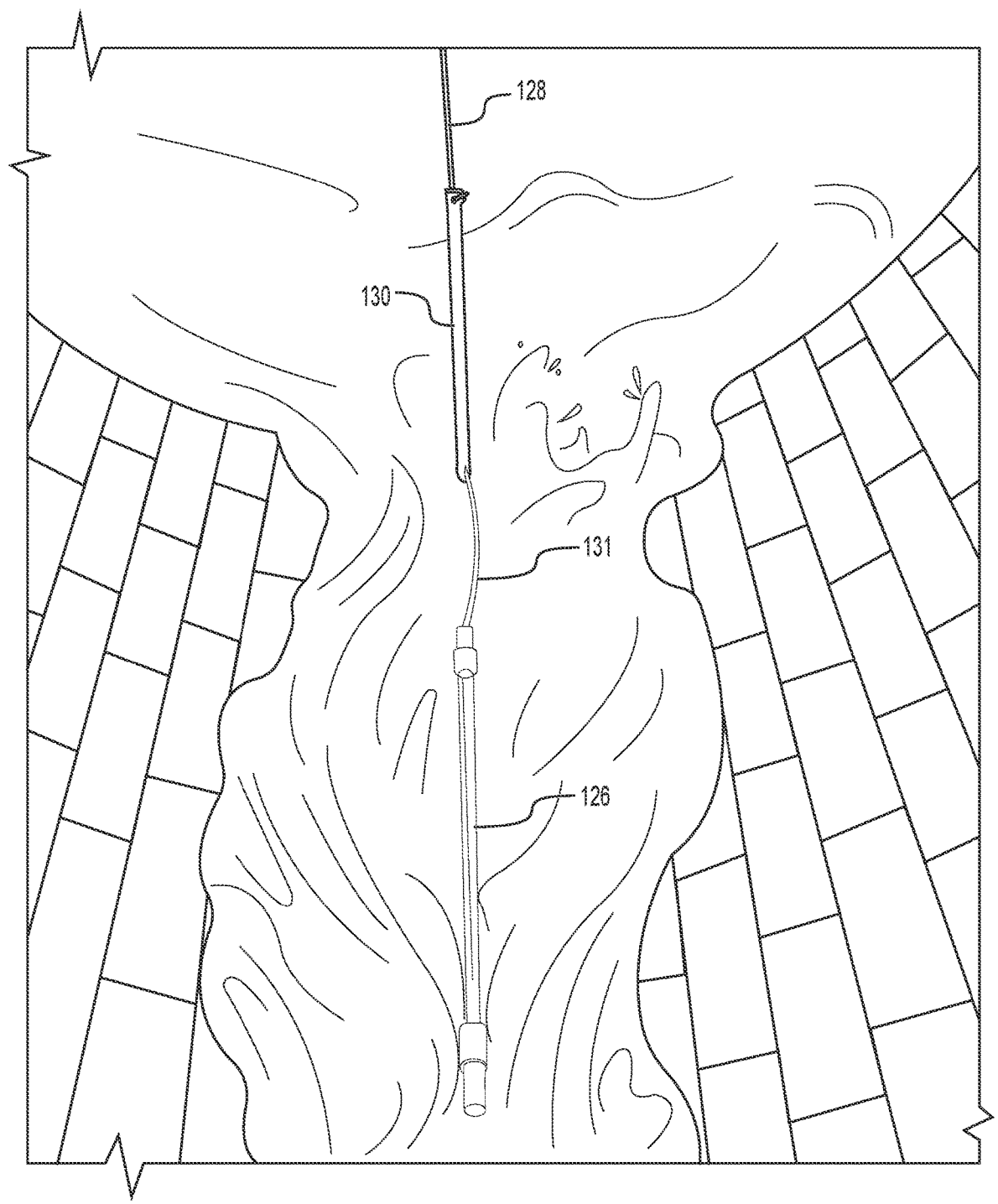
FIG. 16 is a photograph of an embodiment of an acoustic pickup device positioned horizontally in a culvert inlet pipe and marked with start and stop lines for clocking the transit time of a particle carried with the flow.
Figure 17:
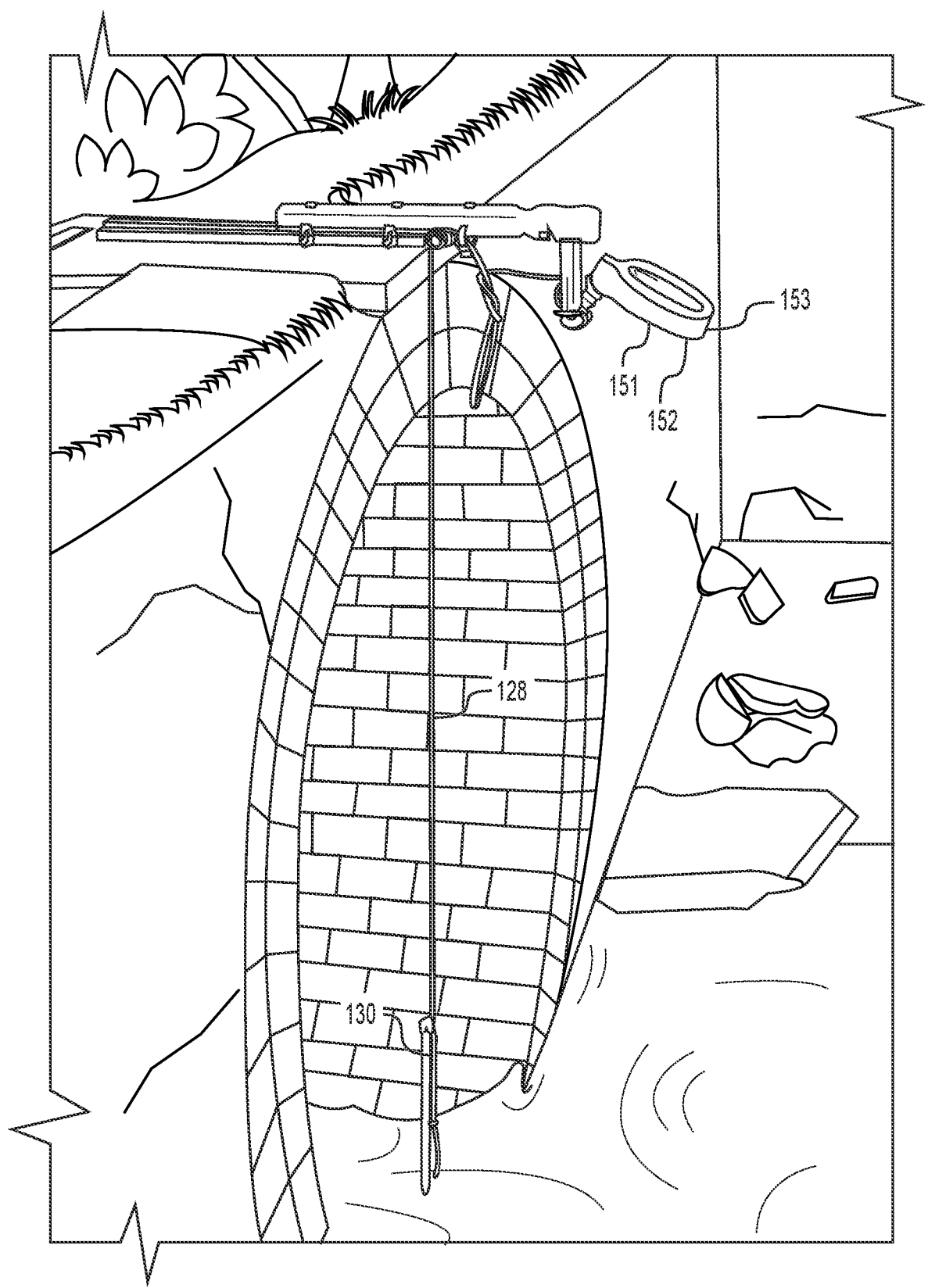
FIG. 17 is a photograph of an embodiment of the invention showing a monitoring apparatus with both sight and sound sensors acquiring flow parameters at the open air drain pipe of a culvert.

FIG. 16 is a photograph of an embodiment of an acoustic pickup device with adjustable horizontal positioning in a pipe. An acoustic pickup device 126 is positioned at the bottom of the flow channel. The acoustic pickup is connected, physically and acoustically, to a sound tube (or sound tube tether) 128. A stabilizer plumb 130 is fastened with an adjustable cinch to the sound tube tether near the bottom of the pipe. The sound tube tether forms an arced nose 131 between the stabilizer plumb and the acoustic pickup device. This allows the sound tube tether to avoid snagging objects that accompany the flowing water yet causes the pickup to lay in a streamlined orientation at the bottom of the flow channel FIG. 17 is a photograph of an embodiment of the invention showing a monitoring apparatus for flowing water at a concrete culvert. The monitoring apparatus of this embodiment may include the following features: a camera 151, lighting 152, an edge computing device 153, at least one sound sensor. All can be housed within all-weather casing. A sound tube tether is connected to the sound pressure sensor. If more than one sound pressure sensor is used, multiple sound tube tethers may be connected to the corresponding sound sensors. The monitoring apparatus also includes a stabilizer plumb 130 for stabilizing the position of an acoustic pickup device.

The acoustic pickups of the invention may include a variety of design options, including, for example, the wet seal or membranes to separate water space from the active air chamber depending on the desired embodiment. The acoustic pickup device may thus be optimized for normally wet flow channel using a membrane or normally dry flow channel using a minimal wet seal.

In one embodiment of the invention, the drainage monitoring apparatus may include two or more acoustic pickup devices to equilibrate or sense differential sound pressures to further quantify flow obstruction parameters and detect seal failure of the electronic enclosure or unauthorized intrusion.

In one embodiment, the invention embraces a submerged acoustic pickup with a frequency response as low as 0 HZ that acquires the surrounding naturally generated sound patterns of moving fluidic media (e.g., water) to capture its native voice (utterances) to quantify its flow parameters.

Another embodiment of the invention embraces supplemental acoustic pickups operating in open air with a frequency response as low as 0 HZ to acquire the naturally generated sound patterns of the atmospheric conditions to quantify time varying atmospheric pressure. The open air may be in close proximity to an acoustic pickup submerged in a flow but vented to the atmosphere.

In another embodiment, the invention includes one or more supplemental acoustic pickups or microphones with a higher frequency response that operate in close proximity to the flow and can acquire sound patterns emanating from the moving fluidic media to capture a wider sound spectrum produced by the voice of the flow.

Synchronized subtraction of the atmospheric sound pattern acquired by a supplemental air space acoustic pickup from the sound pattern acquired by the submerged acoustic pickup which includes the contribution of atmospheric pressure yields the sound pattern generated only by the fluidic media. This differential sensing subtracts out atmospheric sound pressure changes induced by atmospheric conditions.

Another embodiment of the invention embraces an ongoing automatic diagnostic testing methodology that uses infrasonic acoustic pressure variations generated by aft movements in the earth's atmosphere as a continuous, omnipresent, time varying test signal generator that injects acoustic sound pressure patterns into the fluidic media. An on-site open air space acoustic pickup can independently measure infrasonic pressure patterns that can be further validated by a recognized local third party (e.g., regional airport/weather stations/barometers). These infrasonic patterns are expected to also be acquired with fidelity by the submerged acoustic pickup in fluidic media (e.g., water) as a superimposed sound pressure pattern.

In an embodiment of the invention, an acoustical training methodology is used to acquire initial, site specific, training data to jump start the ongoing Machine Learning process by labeling sound patterns that correspond to numerically quantified flow parameters. The ongoing Machine Learning incorporates both site specific and fleet learning by virtue of networked computing. The Machine Learning enables quantification of flow parameters including but not limited to level, width, cross section, direction, turbulence, velocity, volumetric rate, volume and obstruction.

In another embodiment, the grade level methodology makes possible installation of the apparatus of the invention without requiring a person to enter a confined area or wet space to accomplish acquisition of flow parameters. This minimizes cost and provides enhanced safety protections to the person tasked with installation. The procedures discussed above may be performed at arms-length by the installer.

The installation methodology provides not only adjustments for the desired length of a vertical drop but also length adjustments for horizontal set back. This enables a submerged pickup to lay at the bottom of the flow channel and be parallel to the flow and in a favorable position where flow channel boundaries better define the relationship of sound patterns with flow parameters.

In an embodiment of the invention, initial training of the system may be performed prior to insertion of the acoustical pickup into fluidic media using a portable on-site flow channel simulator at grade level with a flex joint conduit that submerges the horizontal or vertical pickup in flowing water that rises and falls to precise levels to generate a sound utterance that corresponds to known flow parameters (e.g., level). This provides an initial training data set for a site-specific acoustical pickup. The training enables flow parameter algorithms to be trained with supervised learning from a high quality data set so that real time responses may be made about similar sound utterances acquired in the future.

In an embodiment of the invention, the membrane of the acoustic pickup membrane device may be fabricated from a variety of materials including but not limited to flexible plastic film, metalized plastic film, multi-layer films, molded rubber or molded elastomeric compounds.

In one embodiment of the invention, a horizontal membrane may be shaped on a cylindrical form factor with a low drag coefficient and constrained by the arced nose of the pickup to navigate debris laden flow without snagging.

In another embodiment, the horizontal membrane employs sufficient sinker weight to rest the intake of the pickup at the bottom of the flow channel. The position may be further confirmed to be in the proper position by on going video imaging.

In another embodiment, the horizontal membrane may be configured to convey sound utterances to the sound tube with increased sensitivity, resolution and dynamic range just by elongating its cylindrical length.

In another embodiment of the invention, the vertical pickup configuration may use a fluidic boundary as a wet seal or a membrane to convey air pressure to the sound tube tether. Vertical pickups may be beneficial in normally dry or for capture the first millimeter of flow to time stamp the beginning of an over flowlike in FIG. 1.

The sound pressure sensor may be located away from the hazards of the flow. This has cost and reliability benefits and also enables the sound conveyance over many meters of distance to be powered by natural flow with zero electrical power consumption. Thus, there is a reduced power need.

Table 1 provides information about how native expressions of flow can quantify flow parameters using machine learning.

TABLE 1

Figure 8:
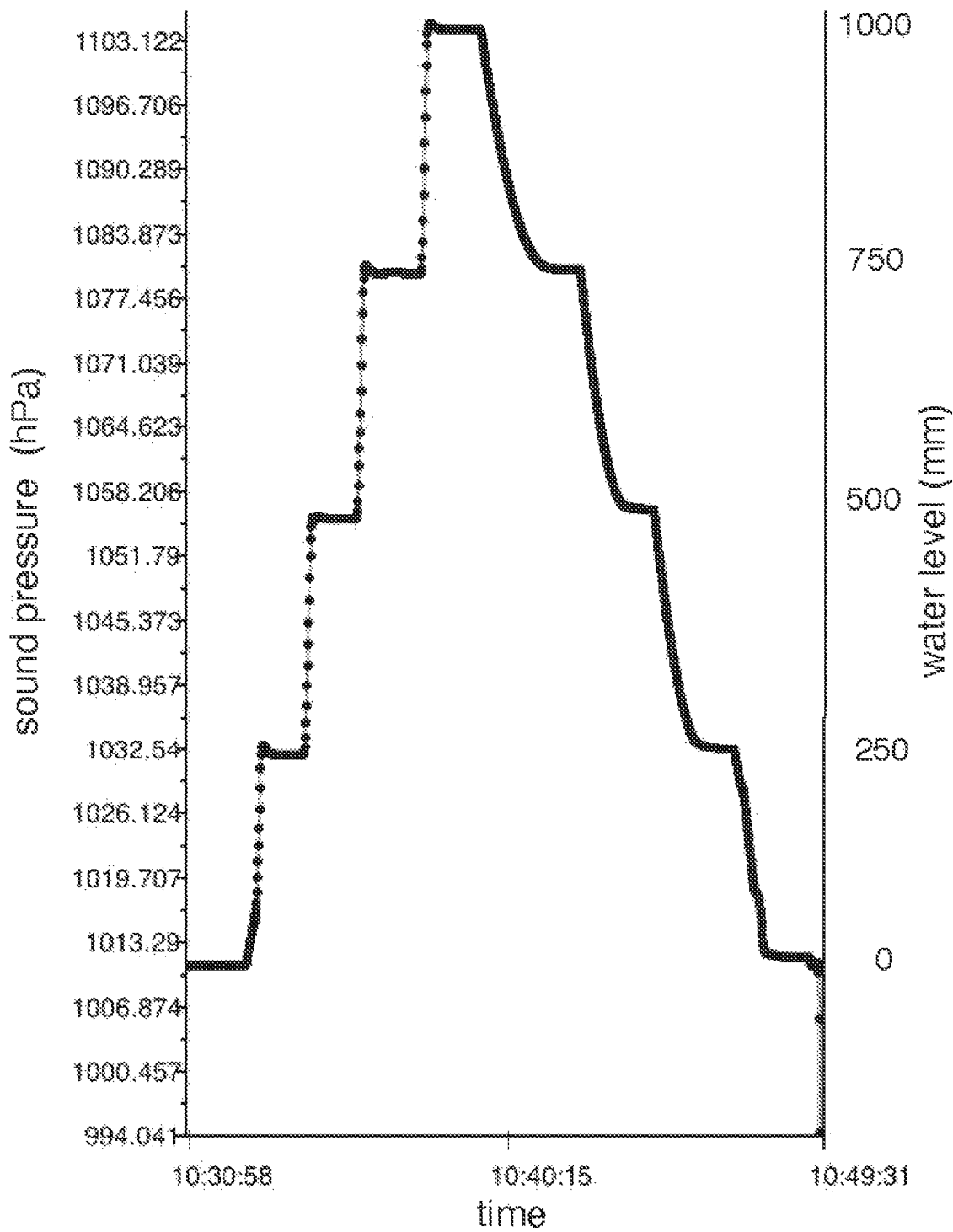
FIG. 8 is a chart of a sound pressure utterance acquired during a site specific, automated machine learning exercise during which sound pressure in hPa is correlated and labeled with water depth in mm to build a high quality data set for the purpose of training the flow level algorithm.

| Data Set Name | Description of Layered Learning | Processing | File Format | Task |
|---|---|---|---|---|
| level | the machine learning process is jump started for a specific monitoring site by forcing water into a portable, on-site flow channel simulator that disciplines the rise and fall of water to accurately known levels; the utterance expressed by this flow is related to water levels to create a high quality dataset that teaches the level algorithm | the utterance of the closely supervised flow is charted in a sound pressure hPa v. time plot FIG. 8; the hPa sound pressures produced by the orchestrated flow are labeled with in mm to create a machine learning data set that teaches the flow level algorithm how to precisely quantify future flow, levels in real time | audio, graphic chart, text | quantify future flow levels by sound only |
| velocity | flow velocity can be expressed by V = D/t and be determined using the transit time (t) of an opportunistic particle moving across a known distance (D), whereby an audio-video recording of the flow scene captures the utterance and the appearances of turbulence and angle of the sound tube tether for the purpose of building data sets that train the flow velocity algorithm | reference objects with known spatial relationships in the flow scene enables computer vision to measure distance; the precise frame rate of the video is used to measure the transit time t across a known distance D to determine velocity V; utterances expressed by the flow are labeled with velocity to create high quality datasets that teaches the level algorithm | audio, audio/video, graphic gage/chart | quantify future flow velocities with sound only, incline only or both sight and sound along with incline as cross checks |
| width | Flow width can be expressed as W = S × p and be determined by using a precise scaling factor S (pixels per mm) and the number of pixels p whereby an audio-video recording of the flow scene captures utterances and the appearance of the wetted flow boundaries | computer vision draws wetted flow boundary lines as rendered from reflected light patterns and counts the number of pixels between the lines to quantify the flow width; utterances expressed by the flow are labeled with flow widths for building a high quality dataset to teach the flow width algorithm | video, graphic gage/chart, text | quantify future flow widths with sound only or both sight and sound as cross checks |
| cross sectional area | the cross-sectional area algorithm layers on top of the depth and width algorithms to determine the geometry of the flow channel, whereby the y | Progressive of exposure of width and depth of the flow channel result from the natural rise and fall of water over time (t); the cross-section algorithm is | audio/video, graphic, text | quantify the geometric profile of the channel |

TABLE 1-continued

| Data Set Name | Description of Layered Learning | Processing | File Format | Task |
|---|---|---|---|---|
| | coordinate depth is provided by sound and the x coordinate width is provided by sight | adaptive in that it compensates for changes in the flow channel geometry should the channel change (see FIG. 2) | | |
| volumetric rate/volume | flow rate can be expressed as Q = A × V and be determined by velocity V and the wetted cross-section A | volumetric rate algorithm layers on top of the level, width, wetted cross section and velocity algorithms to determine the rate of flow; utterances expressed by the flow are labeled with a flow rates for building a dataset to train the flow rate algorithm | text, graphic gage/chart | quantify flow volumes with sound only or both sight and sound as crosschecks |
| obstruction | obstruction algorithm layers on top of all the above plus logic to determine % obstruction, | Example of obstruction logic in an extreme condition: if the level is very high and the flow velocity is zero, then the flow obstruction is 100% | audio/video, graphic gage/chart, text | quantify % obstruction with sound only or both sight and sound as crosschecks |

Furthermore, the learning from table 1 may be extended across a fleet of flow monitoring apparatus sites provided there is similarity between the sites.

The monitoring apparatus and system methodology of the invention allows for the labeling of sound pressure patterns with corresponding water level truth data, preferably with a site-specific training data set as a trust anchor.

Moreover, computer vision may provide training data sets for additional flow parameters or perform cross checks for the quantifications based on sound.

As the present invention may be embodied in several forms without departing from the spirit or essential characteristics thereof, it will be understood that the invention is not limited by the details of the foregoing description, unless otherwise specified, but rather should be construed broadly within its spirit and scope as defined in the appended claims, and therefore all changes and modifications that fall within the metes and bounds of the claims. Accordingly, the invention is defined in the claims and their equivalents.

The invention claimed is:

1. A monitoring apparatus comprising:
   a.) at least one acoustic pickup,
   b.) a sound pressure sensor acoustically coupled to the at least one acoustic pickup, and
   c.) a computing device interfaced to the sound sensor
   wherein the at least one acoustic pickup is submerged in or located in proximity to flowing fluid
   the sound sensor is configured to acquire sound intensity waveforms naturally generated by the flowing fluid as an input data source to algorithms trained by machine learning to quantify flow parameters, and
   the computing device is configured to process expressions native to the flowing fluid for the purpose of predicting flow parameters by listening to sound utterances and observing visual appearances.

2. The monitoring apparatus of claim 1, wherein the fluid is water.

3. The monitoring apparatus of claim 2, wherein the sound pressure sensor and the at least one acoustic pickup are configured to recognize sound with frequencies starting as low as 0 Hz.

4. The monitoring apparatus of claim 2, wherein parameters of the flowing water comprise one or more of level, width, cross section, direction, turbulence, velocity, volumetric rate, volume, and obstruction.

5. The monitoring apparatus of claim 2, wherein the apparatus is mounted from grade level in a location readily accessible by humans.

6. The monitoring apparatus of claim 2, wherein the computing device is an edge computing device assisted by cloud computing infrastructure.

7. The monitoring system of claim 6 wherein the computing device is configured for at least one of automated calibration, self-test diagnostics, sound utterance recognition, detection of sound patterns that trigger increased scrutiny, video imaging and inclinometer cross checks for parameters quantified by sound, automated determination of flow channel geometry and wetted cross sectional area, and machine learning.

8. The monitoring apparatus of claim 2 wherein the apparatus does not require the production of artificial sound to quantify flow parameters of the flowing water.

9. The monitoring apparatus of claim 2 further comprising a video image sensor, wherein the image sensor is in communication with the computing device, and the image sensor is configured so that sounds of particular interest can trigger synchronized sight for further validation of the flow parameters.

10. The monitoring apparatus of claim 2 wherein the at least one acoustic pickup is acoustically coupled to the sound pressure sensor via a noise isolating sound tube, the sound tube acts as a tether between the sound pressure sensor and the at least one acoustic pickup, and the sound tube conveys acoustic pressure waves from the flowing water to the sound pressure sensor.

11. The monitoring apparatus of claim 2 further comprising a supplemental acoustic pickup with a frequency response as low as 0 Hz, said supplemental acoustic pickup is acoustically coupled to the sound pressure sensor, wherein the at least one acoustic pickup is submerged in the flowing water, the supplemental acoustic pickup is located in air open to the atmospheric nearby the at least one acoustic pickup submerged in water, and the supplemental acoustic pickup is configured to acquire the naturally generated sound patterns of the atmospheric conditions to quantify time varying atmospheric pressure.

12. The monitoring apparatus of claim 11 wherein the sound pattern acquired by the supplemental acoustic pickup is subtracted from the sound pattern acquired by the at least one acoustic pickup submerged in water to yield the sound pattern of the water without the effects of changing atmospheric pressure.

13. The monitoring apparatus of claim 12, wherein the computing device is configured to gather sound pressure patterns from a third party to validate the sound pressure.

14. The monitoring apparatus of claim 2 wherein the flowing water is storm water, sewer water, wastewater, process water, a natural watershed, or mixtures of the same, and the flowing water is organized by a pipe, a channel, an embankment, a catchment basin, a holding tank, a manhole invert, or a culvert.

15. An acoustic pickup comprising: an active air chamber configured to respond to sound pressure in a fluidic environment; and a sound tube connected to the active air chamber, said sound tube configured to convey sound pressure to a sound sensor, wherein the acoustic pickup is adapted to acquire the naturally generated sound utterances of a moving fluid to quantify its flow parameters, the sound tube acts as a tether between the sound sensor and the acoustic pickup, and a targeted fluid surrounds at least a portion of the active air chamber.

16. The acoustic pickup of claim 15, wherein the fluid is water.

17. The acoustic pickup of claim 16, wherein the frequency response is as low as 0 Hz.

18. The acoustic pickup of claim 17, further comprising a stabilizer plumb to stabilize the horizontal and vertical position of the acoustic pickup, wherein the stabilizer plumb is connected to the sound tube, and an arc allows the pickup lay on the bottom of the flow channel and to avoid snagging objects in the moving water.

19. The acoustic pickup of claim 18, wherein the stabilizer plumb is positioned substantially vertically and is adapted for adjustment which sets the length of the sound tube arc to enable desired placement of the acoustic pickup in the water.

20. The acoustic pickup of claim 18 further comprising an inclinometer that measures the angle of deflection of the sound tube as another measurement of at least one of velocity, turbulence, direction and obstruction to further crosscheck flow parameters acquired from the sound utterances and visual appearances.

21. The acoustic pickup of claim 16, wherein the active air chamber is cylindrical.

22. An acoustic pickup comprising: a permeable fairing and a sound tube, wherein the fairing has a chamber, the sound tube has a sealed connection to active air of the chamber, the sound tube is configured to convey sound to a sound pressure sensor, the acoustic pickup is adapted to acquire the naturally generated sound utterances of a moving fluid to quantify its flow parameters, the sound tube acts as a tether between the sound sensor and the acoustic pickup to structurally support the pickup, and a targeted fluid surrounds at least a portion of the permeable fairing.

\* \* \* \* \*